UNITED STATES PATENT OFFICE.

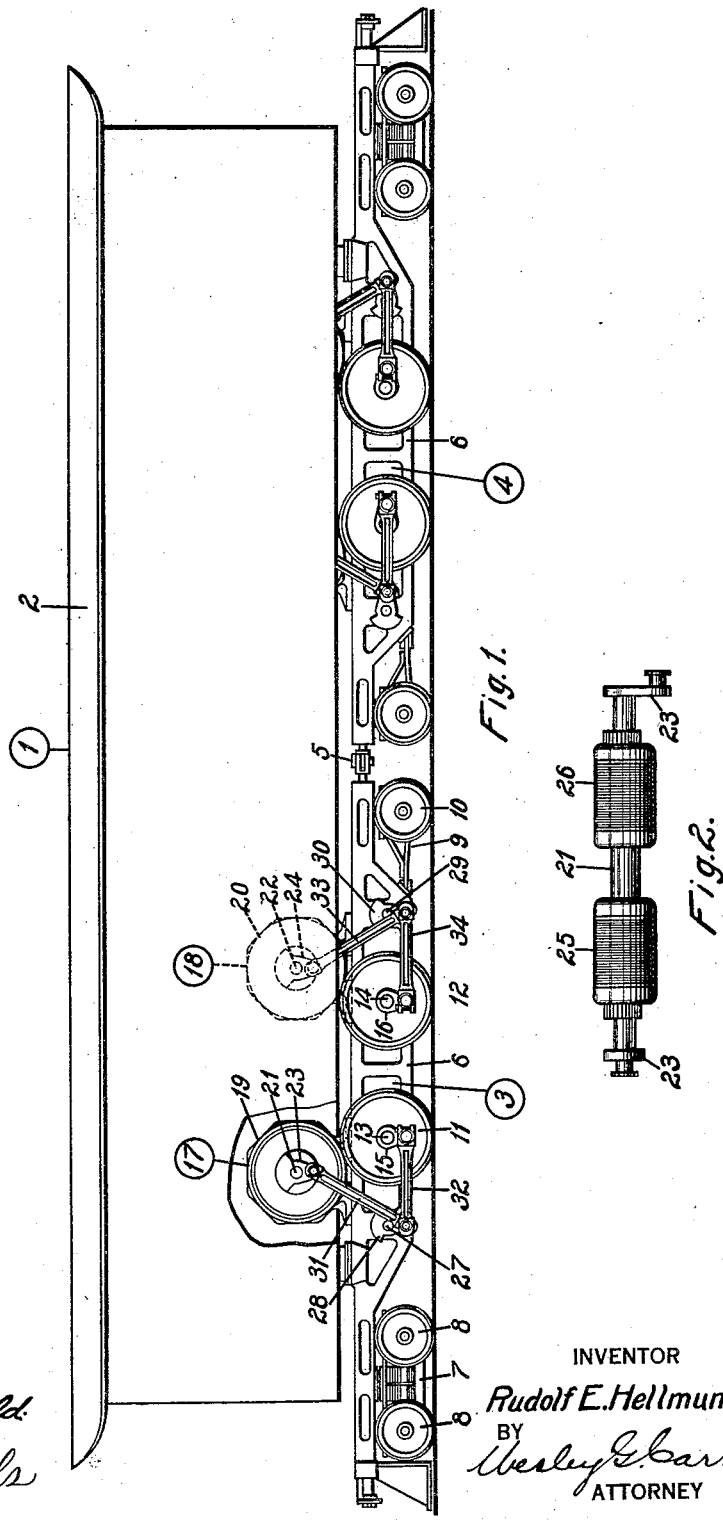
R. E. HELLMUND.
LOCOMOTIVE.
APPLICATION FILED OCT. 30, 1916.
1,269,602. Patented June 18, 1918.
WITNESSES:
R. J. Fitzgerald
W. B. Wells
INVENTOR
Rudolf E. Hellmund.
BY
Wesley G. Carr
ATTORNEY

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

LOCOMOTIVE.

1,269,602.     Specification of Letters Patent.     Patented June 18, 1918.

Application filed October 30, 1916. Serial No. 128,424.

*To all whom it may concern:*

Be it known that I, RUDOLF E. HELLMUND, a subject of the German Emperor, and a resident of Swissvale, in the county of Allegheny and State of Pennsylvania, have invented a new and useful Improvement in Locomotives, of which the following is a specification.

My invention relates to electrically propelled vehicles and particularly to electrical locomotives which are adapted for operation at relatively high speeds.

One object of my invention is to provide an electric locomotive that shall be provided with a plurality of propelling motors having twin armatures which are tandem-mounted on one shaft and with means for independently connecting each motor to one pair of the driving wheels.

Another object of my invention is to provide a locomotive of the above indicated character that shall be provided with a jack shaft disposed adjacent to each pair of driving wheels and rods for joining each jack shaft to one of the propelling motors and to one pair of the driving wheels.

More specifically, my invention embodies a locomotive having a cab and two articulated running gear units each of which comprises a forward four-wheel pivotal guiding truck, a rear two-wheel radial truck and two pairs of driving wheels disposed between the pivotal and the radial truck and having wheels of larger diameter than the wheels on the guiding trucks. A motor having two tandem-mounted armatures is mounted above each pair of driving wheels and is connected thereto by means of a rod-and-jack-shaft connection.

In the accompanying drawing, Figure 1 is a view, partially in section, of a locomotive constructed in accordance with my invention, and Fig. 2 is a detail view of the armatures and the armature shaft for one of the motors.

Referring to the accompanying drawing, an electric locomotive 1 embodies a cab 2 and two running gears 3 and 4 which are connected together by means of an articulated connection 5 and are pivotally joined to the cab 2.

Each of the running gears embodies side frames 6, a forward four-wheel pivotal guiding truck 7 having wheels 8, a rear two-wheel radial truck 9 having wheels 10 and two pairs of driving wheels 11 and 12 which are disposed between the pivotal truck 7 and the radial truck 9. The two pairs of driving wheels 11 and 12 are respectively provided with axles 13 and 14 and driving cranks 15 and 16. Two motors 17 and 18 are respectively mounted on the side frames 6 above the pairs of driving wheels 11 and 12 and embody frames 19 and 20, armature shafts 21 and 22 and crank disks 23 and 24 which are respectively mounted on the armature shafts 21 and 22. Each of the armature shafts 21 and 22 is provided with twin armatures 25 and 26 which are tandem-mounted, as illustrated in Fig. 2 of the drawing.

A jack shaft 27, provided with crank disks 28, is mounted on the side frames 6 adjacent to the driving wheels 11, and a jack shaft 29, provided with crank disks 30, is mounted on the side frames 6 adjacent to the pair of driving wheels 12. A rod 31 is provided for connecting the armature crank disk 23 with the jack-shaft crank disk, and a side rod 32 is provided for connecting the jack-shaft crank disk with the driving crank 15 which is mounted on the axle 13 of the driving wheels 11. A rod 33 is provided for connecting the crank disk 24 of the motor 18 with the crank disk 30 of the jack shaft 29, and a side rod 34 is provided for connecting the crank disk 30 of the jack shaft 29 with the crank arm 16 of the pair of driving wheels 12.

Thus, it is apparent that the pairs of driving wheels of each running gear are each provided with an individual driving motor having twin armatures and are connected thereto by means of a jack-shaft-and-rod connection, so that the locomotive may be operated at relatively high speed and still exert a relatively high tractive effort.

Variations in the structure and arrangement and location of parts may be made without departing from the spirit and scope of my invention, and such modifications are intended to be covered in the appended claims.

I claim as my invention:

1. In a locomotive, the combination with a cab and two articulated running gears having pairs of driving wheels adapted to support said cab, of motors mounted on each of said running gears, and rods for transmitting the driving effort of each motor to one pair of said driving wheels.

2. In a locomotive, the combination with a cab and two articulated running gears having pairs of driving wheels adapted to support said cab, of motors mounted on each of said running gears, each of said motors having two armatures tandem mounted on one shaft, and means comprising rods for transmitting the driving effort of each motor to one pair of said driving wheels.

3. In a locomotive, the combination with a cab and articulated running gears having pairs of driving wheels, of motors and independent rod connections between each of said motors and one pair of said driving wheels.

4. In a locomotive, the combination with a cab and articulated running gears having pairs of driving wheels for supporting said cab, of motors mounted on said running gears, each of said motors having two armatures tandem mounted on one shaft, and independent rod connections between each of said motors and one pair of said driving wheels.

5. In a locomotive, the combination with a cab and a plurality of articulated running gears having driving wheels mounted thereon, of motors mounted on said running gears, and a jack shaft and two rods for joining each motor to a pair of driving wheels, whereby the driving effort of the motors may be transmitted to the driving wheels.

6. In a locomotive, the combination with a cab, of articulated running gear units supporting the same, each unit comprising a plurality of motors and a single pair of driving wheels associated with each motor, a jack shaft located adjacent to each pair of driving wheels and the motor associated therewith, and means for connecting a motor and a pair of driving wheels to the associated jack shaft, whereby the driving effort of each motor may be transmitted to the associated driving wheels.

7. In a locomotive, the combination with a cab and two articulated running gears, each having two pairs of driving wheels mounted thereon, of two motors mounted on each of said running gears and each comprising two armatures tandem mounted on one shaft, a jack shaft associated with each pair of driving wheels, and rods connecting each jack shaft to one motor and to one pair of driving wheels, whereby the driving effort of each motor may be transmitted to an independent pair of driving wheels.

8. In a locomotive, the combination of a single cab, two articulated running gear units supporting the same, each of said units comprising two independent jack shafts, two independent pairs of driving wheels associated with said jack shafts, two motors and means for joining each jack shaft to one motor and to one pair of driving wheels.

9. In an electric locomotive, the combination of a single cab, two articulated running gear units supporting the same, each of said units comprising two independent jack shafts, two independent pairs of driving wheels disposed between said jack shafts, two mechanically independent electric motors, one motor being disposed above each pair of driving wheels, and means for joining each jack shaft to the pair of driving wheels adjacent thereto and to the electric motor above the same.

10. In a locomotive, the combination with a cab, and two articulated running gears, each of said running gears comprising two pairs of driving wheels and a pivotal and a radial guiding truck, of two motors mounted on each running gear and means comprising rods for transmitting the driving effort of each motor to one pair of said driving wheels.

11. In a locomotive, the combination with a cab, and two articulated running gears, each of said running gears comprising two pairs of driving wheels and a pivotal and a radial guiding truck, of two motors mounted on each running gear and means for transmitting the driving effort of each motor to one pair of said driving wheels.

12. In a locomotive, the combination with a cab and two articulated running gears, each of said running gears comprising two pairs of driving wheels and a pivotal and a radial guiding truck, of two motors mounted on each running gear, each of said motors comprising two armatures tandem mounted on one shaft, and means for transmitting the driving effort of each motor to one pair of said driving wheels.

In testimony whereof, I have hereunto subscribed my name this 25th day of Oct., 1916.

RUDOLF E. HELLMUND.

Copies of this patent may be obtained for five cents each, by addressing the "Commissioner of Patents, Washington, D. C."